June 5, 1956 N. A. NELSON ET AL 2,748,686
ROW MARKER IMPLEMENT
Filed Sept. 9, 1950 6 Sheets-Sheet 1

INVENTORS
NORAL A. NELSON
ULRIC LANDENBERGER
BY
Carlsen, Pitzner, Hubbard & Wolfe
ATTORNEYS

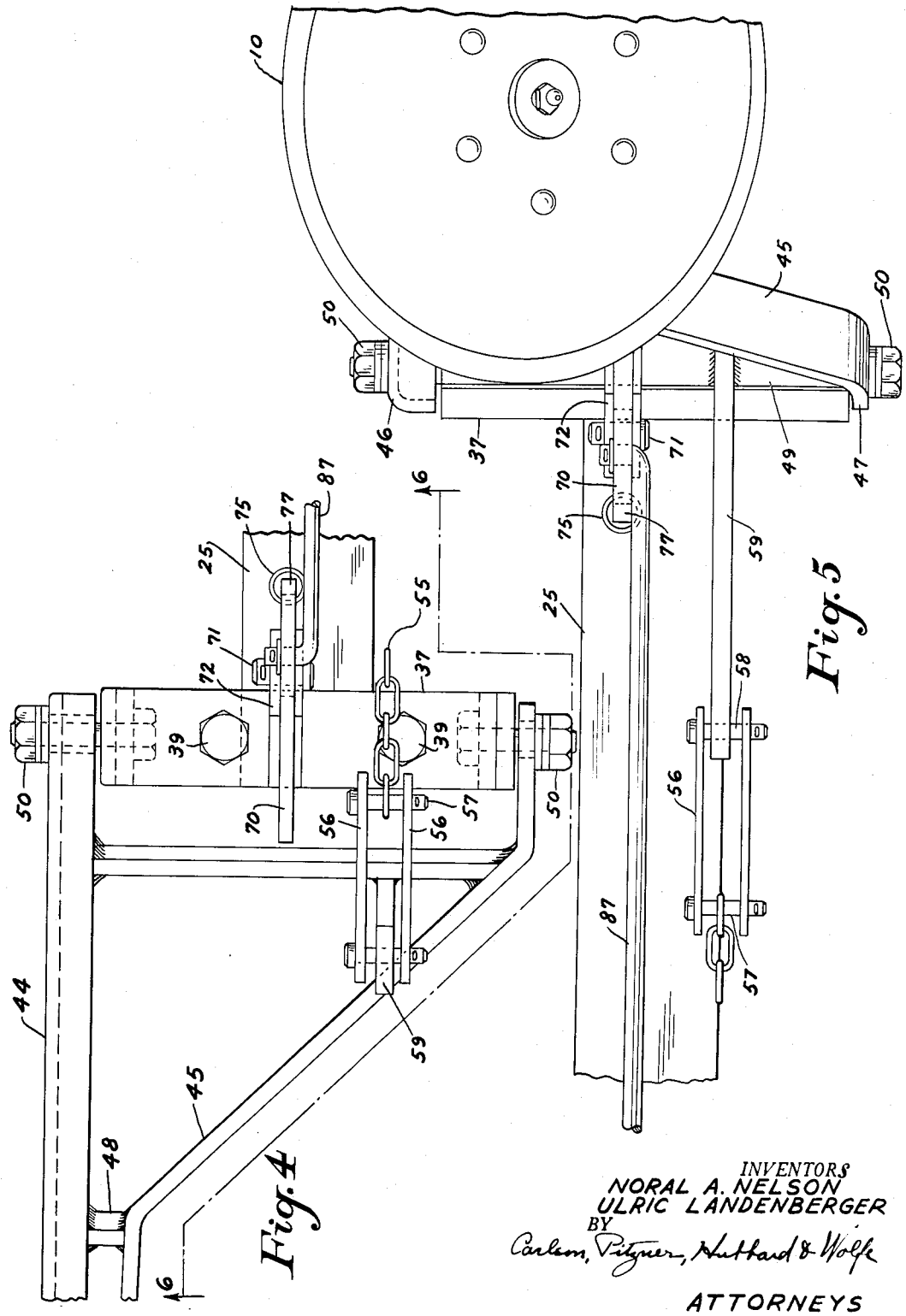

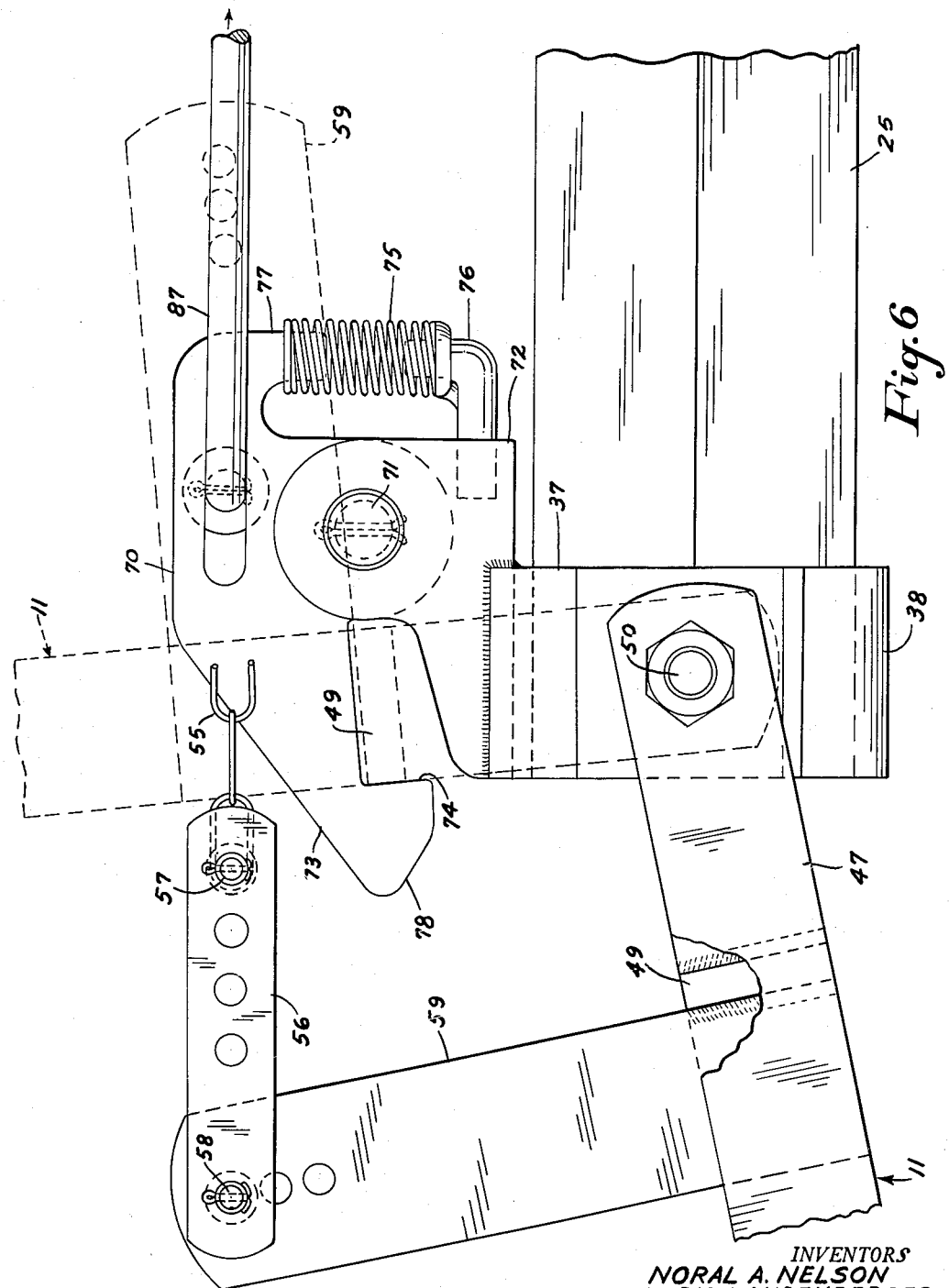

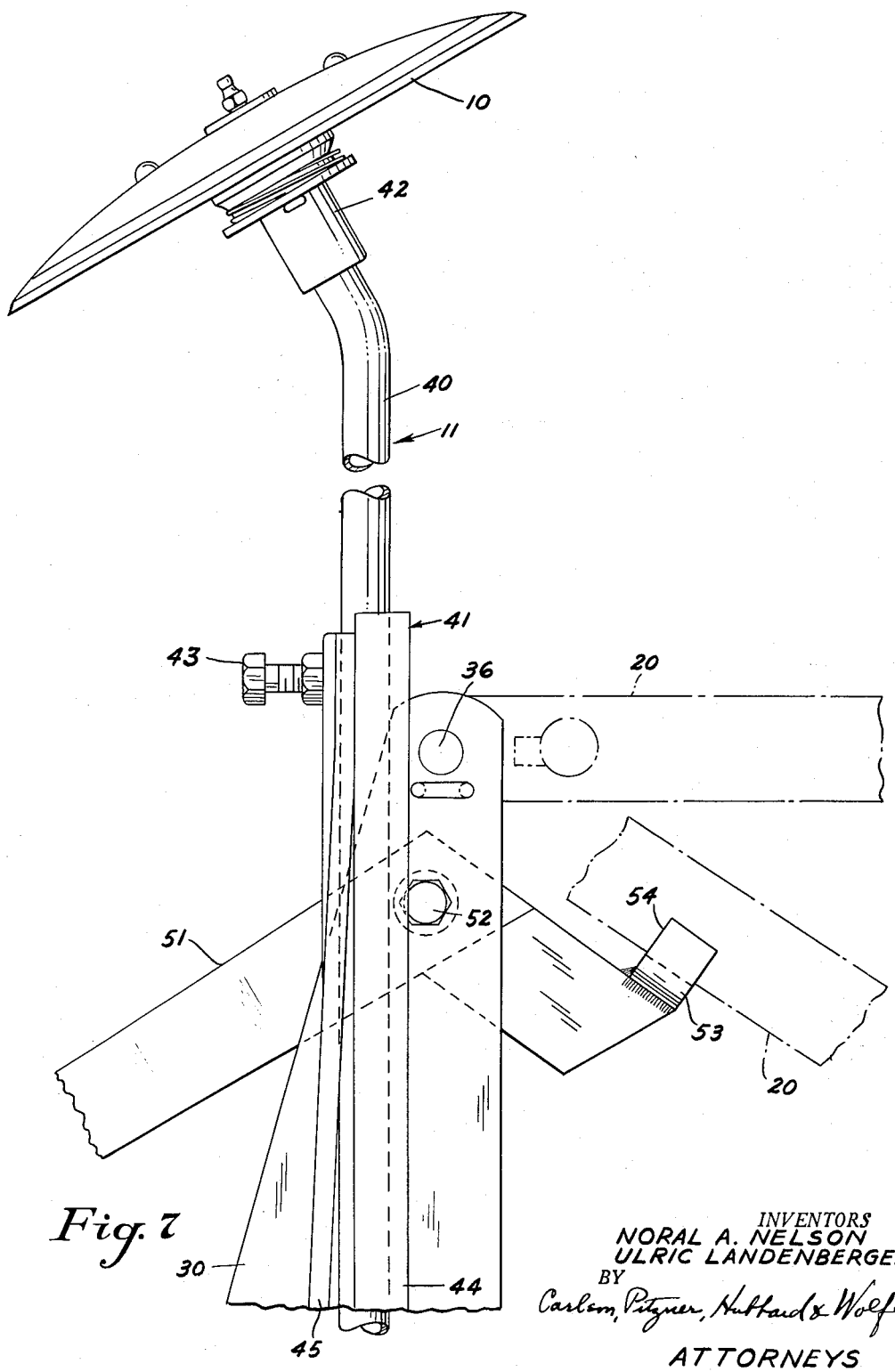

United States Patent Office 2,748,686
Patented June 5, 1956

2,748,686

ROW MARKER IMPLEMENT

Noral A. Nelson and Ulric Landenberger, Detroit, Mich., assignors to Harry Ferguson, Inc., Detroit, Mich., a corporation of Delaware Application September 9, 1950, Serial No. 184,018

4 Claims. (Cl. 97—230)

The invention relates to tractor borne agricultural implements and more particularly to implements of the type having a plurality of ground engaging elements adapted for operation individually and selectively. Elements of the above general character are especially well suited for use as row markers and the present invention has been illustrated herein as embodied in an implement for such use.

One object of the invention is to provide a simplified mechanism for effecting the lifting and selective lowering of a pair of implement elements such as marker arms as an incident to the bodily lifting and lowering of the implement by the power lift of a tractor with which it is operatively associated.

Another object is to provide an implement having individually movable ground engaging elements adapted to be swung to and latched in a retracted position when the implement is raised to transport position by the power lift device of the tractor with which it is associated, together with improved means for releasing the latched elements selectively for movement to operative position when the implement is lowered for operation.

Still another object is to provide row marking mechanism including a pair of swinging marker arms readily mountable upon a floating frame structure of the type employed for planters and which is operable to release the arm selectively for action and to swing them to retracted positions without interfering in any way with the normal movements of the planter frame such as those taking place as the planter elements shift to follow changes in ground contour.

Other objects and advantages of the invention will become apparent from the following detailed description of the preferred embodiment illustrated in the accompanying drawings, in which:

Fig. 4 is a fragmentary plan view of the supporting and latching structure for one of the marker arms.

Fig. 5 is a fragmentary plan view showing a marker arm in raised or retracted position.

Fig. 6 is a fragmentary side view of a marker arm and its supporting and latching structure taken in offset planes substantially on the line 6—6 of Fig. 4.

Fig. 7 is a fragmentary side view showing a part of the arm lifting mechanism.

Figure 1:
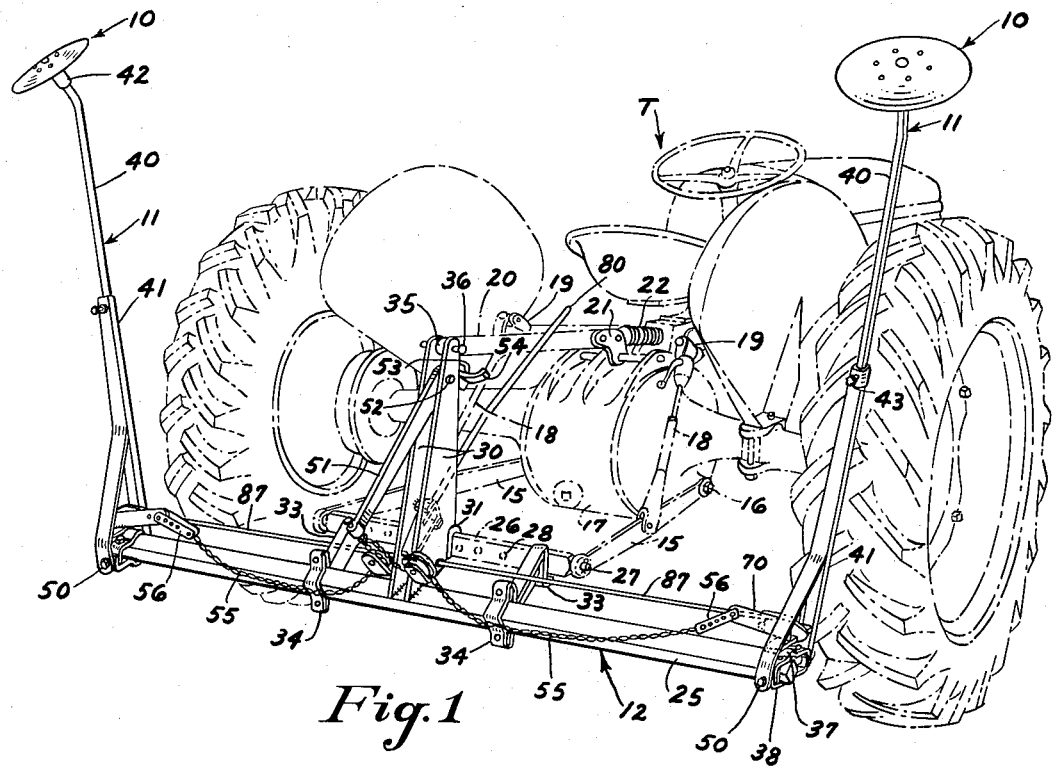
Fig. 1 is a rear perspective view of an implement frame equipped with row marking mechanism embodying the features of the invention, the frame being shown attached to a tractor equipped with a power lift hitch linkage.

For purposes of illustration the invention has been shown in the form of an implement including a pair of ground engaging elements 10 carried by elongated arms 11 pivotally mounted on an implement frame 12 for swinging movement between a raised or retracted position in which they are shown in Fig. 1 and a lowered or operating position as shown in Fig. 6. The ground engaging elements 10 are shown as rotatably supported discs particularly well adapted for running along a previously planted row or other base line for gauging the planting of a succeeding row. When so operating, the supporting arm 11 occupies the lowered position. When not in operation, the arm is raised to the retracted position. The present invention is concerned primarily with the mechanism whereby such raising of the arms is effected by power derived from the tractor towing the implement and whereby the lowering is effected selectively under control of the operator, as will appear presently.

Although the invention is susceptible of various modifications and alternative constructions and uses, we have shown in the drawings and shall herein describe in detail the preferred embodiment of the invention. It is to be understood, however, that we do not intend to limit the invention by such disclosure, but intend to cover all modifications and alternative constructions and uses falling within the spirit and scope of the invention as expressed in the appended claims.

In the illustrative embodiment, the implement frame 12 carrying the row marking mechanism has been shown as operatively coupled with a tractor T through the medium of a vertically swingable hitch linkage powered from the tractor. The hitch linkage which may be of the general type disclosed in the Ferguson Patent No. 2,118,180 issued May 24, 1938, includes a pair of laterally spaced lower or draft links 15 pivoted as at 16 for universal swinging movement on the rear portion of the tractor center housing 17. The links 15 are supported by drop links 18 from crank arms 19 carried at opposite ends of a rockshaft (not shown) journalled on the housing 17. A hydraulic power unit enclosed within the housing 17 is operative to rock the shaft and thus swing the links 15 and the implement frame 12 between a lower or working position and a raised or transport position.

Also forming a part of the hitch linkage is an upper or control link 20 universally pivoted at its forward end to a shackle 21 pivoted on the upper rear portion of the housing 17. As explained in the above mentioned Ferguson patent, the thrust on the link 20 resisted by a control spring 22 may be utilized to control the hydraulic power unit automatically for regulating the draft load of a tillage implement or the like. As the present invention is concerned only with the raising and lowering of an implement between working and transport positions, a detailed disclosure of the automatic controls is believed to be unnecessary.

The implement frame 12 herein shown is similar to that incorporated in the multiple row planter disclosed and claimed in the copending Nelson application Serial No. 165,489 filed June 1, 1950. Briefly, the frame comprises a transverse tool bar 25 upon which the seeding elements and other appurtenances of the planter are detachably and adjustably mounted, as explained in the Nelson application. Coupling means is provided on the frame for attachment to the tractor hitch linkage which affords a substantial degree of flexibility or, in other words, a floating connection between the implement and the tractor. The coupling means in its preferred form is adapted to operate with a drawbar 26 which may be associated more or less permanently with the draft links 15. The drawbar has connecting pins 27 at opposite ends which engage in the usual ball and socket elements provided on the trailing ends of the links and which are retained in place by linch pins or the like. The drawbar also has a series of holes 28 uniformly spaced apart longitudinally of the bar for attaching purposes.

Figure 2:
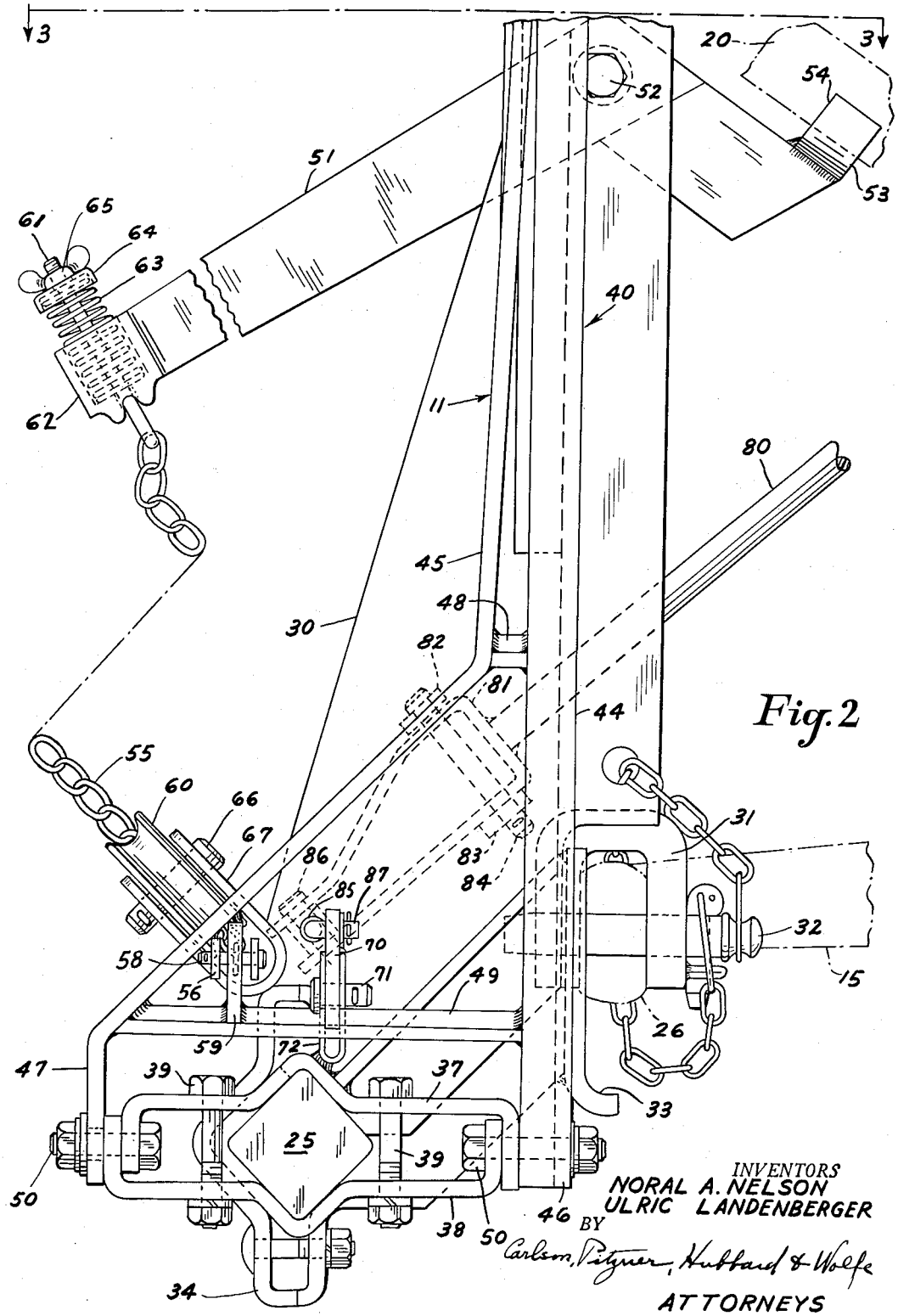
Fig. 2 is a side view of the implement frame showing details of the row marking mechanism.

Welded or otherwise suitably attached at their lower ends to the central portion of the tool bar 25 are a pair of generally triangular steel plates 30 defining a rigid upright strut. In the present instance the plates are attached to the tool bar so that their forward edges extend substantially beyond the bar and serve to support a U-shaped yoke or coupling element 31 adapted to engage over the drawbar 26, as shown in Figs. 1 and 2. A pin 32 inserted through alined holes in the yoke and a selected one of the holes 28 in the drawbar secures the parts together for relative rocking or pivotal movement about a horizontal fore and aft axis. Preferably the yoke 31 is dimensioned to afford clearance for the drawbar and the holes 28 likewise provide clearance for the pin 32 so that a limited degree of rocking movement about a vertical axis is permitted.

To restrain the rocking movements of the frame relative to the drawbar 26 within predetermined limits, stop elements 33 are provided at opposite sides of the yoke 31. In the present instance these stop elements are removably and adjustably mounted on the tool bar by means of clamping straps 34.

The strut plates 30 are spaced apart longitudinally of the tool bar 25 so as to receive between them the rear end portion of the upper hitch link 20. In accordance with the usual practice, this link is provided at its rear end with a suitable ball element 35 and connection with the strut plates is effected by a pin 36 extending through coupling apertures in the plates and through the ball element.

The marker arms 11 are mounted at opposite ends of the tool bar 25 to swing about substantially horizontal axes disposed transversely of the axis of the tool bar. In accordance with the invention, the mounting is such that the arms can be secured easily when they are not required and can be replaced with equal facility. Such mounting is effected in the present instance by clamp devices, each comprising upper and lower clamping straps 37 and 38 (Figs. 1 and 2) formed with complemental centrally located recesses conforming generally to the shape of the tool bar 25. The straps may thus be assembled in embracing relation to the tool bar and frictionally clamped thereto by fastening devices such as bolts 39. As will be seen by reference to Fig. 2 of the drawings, the end portions of the straps 37 and 38 are extended and bent over substantially at right angles so as to overlap and define fore and aft spaced bearing seats for the associated marker arm 11.

The marker arms 11 are preferably alike in construction. As herein shown, each arm comprises an outer section 40 and an inner section 41. The outer section 40 may be tubular and is provided at its outer end with a fitting 42 (Fig. 7) for rotatably supporting the disc element 10. At its inner end the tubular section is adjustably received in a socket formed in the arm section 41 and is locked in adjusted position therein as by a locking screw 43.

In the preferred form illustrated the arm section 41 is constructed from two rigid members such as steel bars 44 and 45 secured together in side by side relation and diverging at their lower ends to form spaced legs 46 and 47 adapted to straddle the clamping straps 37 and 38 and engage the bearing seats formed thereon. Referring to Fig. 2, it will be observed that the bar 44 is channel-shaped in section and the bar 45, which is flat, is secured in opposed relation to the channel to define the socket for the arm section 40. Cross members 48 and 49 extending between and welded to the bars retain them in spaced relation and impart rigidity to the structure. Bolts 50 or other suitable fastening elements inserted through alined holes in the legs 46 and 47 and in the overlapping ends of the straps 37 and 38 pivotally secure the arm section to the clamp device for swinging movement about an axis disposed transversely of the tool bar 25.

With the implement frame connected to the hitch links 15 and 20 of the tractor in the manner heretofore described, it will be evident that the links, together with the center housing 17 of the tractor and the upright strut 30 of the frame, form a quadrilateral figure. Since the links pivot about axes fixed with respect to the housing, the shape of the quadrilateral figure will change progressively as the implement connected to the links is raised or lowered with respect to the tractor. More particularly the angle between the upper link 20 and the strut 30 will decrease as the implement is raised toward transport position and will increase as the implement is lowered toward working position. This change is utilized in the present instance to raise the marker arms 11 and to permit their lowering by gravity.

The mechanism for raising the marker arms is preferably constructed and arranged to impart such movement to the arms in response to the lifting of the implement to or toward transport position. For this purpose an actuating member 51 herein shown as a bell crank lever is pivotally mounted intermediate its ends on a pin 52 inserted through suitable holes in the strut plates 30. The pivot for the lever is located so that the forward end of the lever is positioned for engagement by the top link 20 and is swung downwardly relative to the implement as the links are swung upwardly relative to the tractor. The arrangement is such that the lever is rocked about its pivot (clockwise as viewed in Fig. 2) from the idle position shown in Fig. 1 to the operated position shown in Fig. 2, as an incident to the lifting of the implement from operating to transport position.

To avoid interference with the flexible mounting of the implement and to insure engagement between the lever 51 and the link 20 in all positions of the implement, the lever is provided at its forward end with a one way connection comprising a crosspiece 53 extending transversely below the link 20 for abutting engagement with the lower edge face of the link. Preferably the ends 54 of the crosspiece are turned upwardly to form abutments defining the limit positions of the link with respect to the lever.

The vertical rocking movements of the actuator member or lever 51 are transmitted to the marker arms 11 through the medium of flexible tensile elements 55, herein shown as chains, connected between the rear end of the lever and the respective marker arms. Each of the chains 55 is connected at its outer end to one of the marker arms through the medium of a pair of spaced parallel links 56 apertured to receive a pin 57 insertable through a link of the chain. Additional apertures are provided in the links for the reception of a pin 58 receivable in an aperture in the outer or upper end of a rigid strut 59 secured to the arm 11 adjacent its lower end and projecting laterally therefrom. Preferably the links and strut each have a series of spaced apertures for the pins 57 and 58 whereby the effective length of the flexible connecting member may be varied and the leverage ratio afforded by the strut may be adjusted as required.

In the particular structure illustrated, the connecting strut 59 is welded to the cross member 49 of the arm 11 and to the adjacent portion of the bar 47, as shown in Fig. 2. By effecting the connection of the chain to the marker arm at a point spaced laterally from its pivotal axis, the arm may be allowed to swing substantially below a horizontal plane without interfering with the raising action.

Each of the chains 55 extends inwardly from the marker arm generally parallel to the tool bar 25 and over a guide sheave 60 with the inner end portion of the chains directed upwardly to the end of the lever 51. The chains are preferably anchored to the lever so as to provide a limited degree of flexibility, thus making it unnecessary to gauge the limit position of the marker arms with a high degree of accuracy. As herein shown, the connection is effected by means of an eye-bolt 61 slidably received in a socket 62 formed in the end of the lever. A coiled spring 63 interposed between the lever and a washer 64 held on the bolt by a nut 65 threaded thereon opposes the pull on the chains when the marker arms are being lifted.

Figure 3:
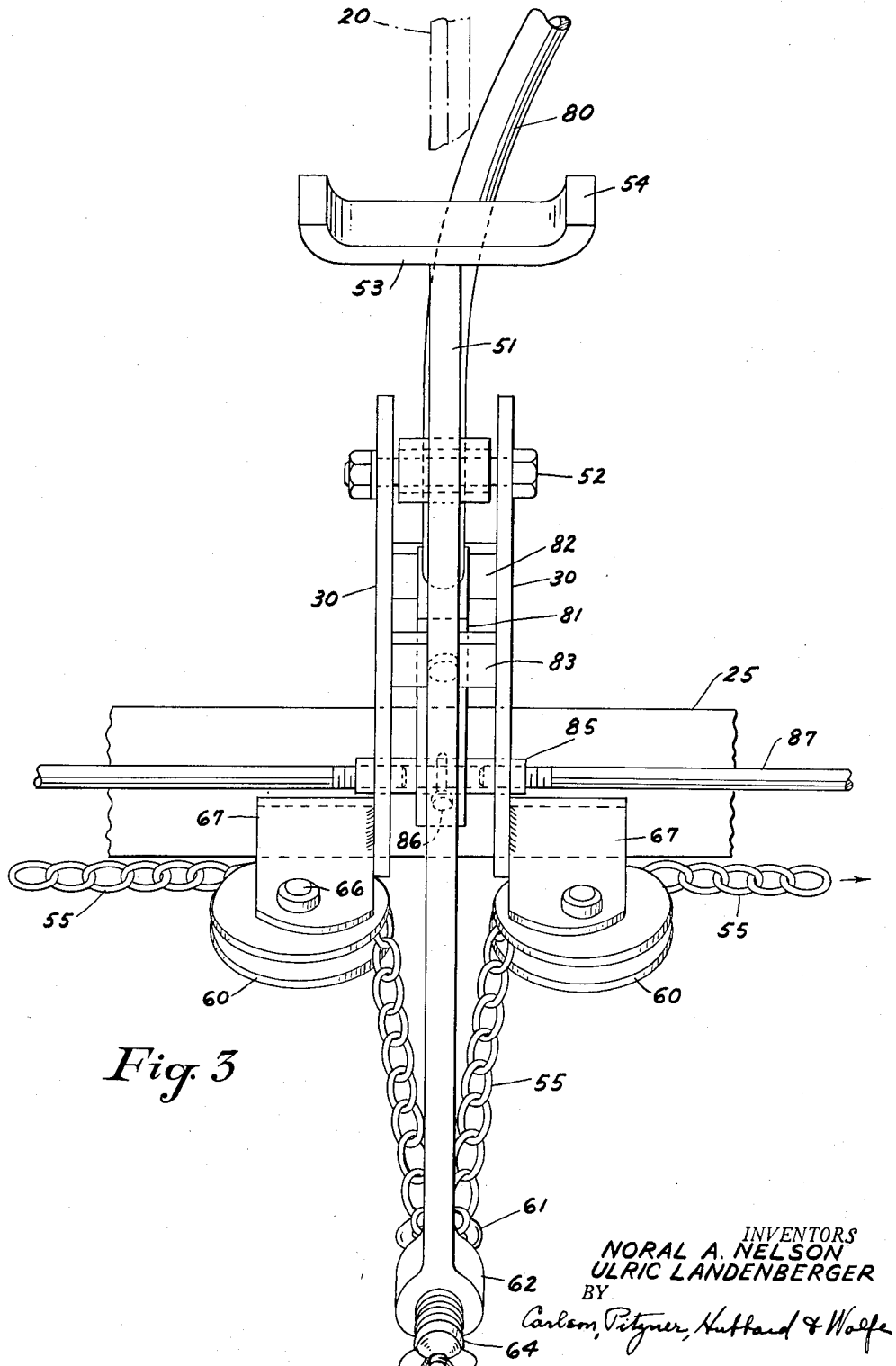
Fig. 3 is a fragmentary top view of the mechanism taken in a plane substantially on the line 3—3 of Fig. 2.

As shown in Figs. 1–3, the sheaves 60 are rotatably supported on pins 66 in brackets 67 welded to the strut plates 30 adjacent their lower ends. Preferably the axis of each sheave is inclined as shown in Fig. 2 so as to lie substantially parallel to the run of the chain between the sheave and the actuating lever.

To maintain the marker arms in raised position when not in use, provision is made for latching them in their raised or retracted positions and for releasing them selectively at the will of the operator. The latch means in its preferred form includes a latch element 70 for each marker arm pivotally supported by a pin 71 on a bracket 72 welded or otherwise rigidly secured to the upper clamping strap 37, as shown in Figs. 2 and 4–6. The latch element 70 is formed with a nose portion 73 notched on its underside to present a shoulder adapted to engage over the cross member 49 of the marker arm as the latter is swung to its retracted position in which it is shown in broken lines in Fig. 6. A compression spring 75 interposed between a supporting stud 76 rigid with the bracket 72 and a tailpiece 77 formed on the latch member urges the member to latching position. Preferably the nose portion 73 of the latch element is beveled as at 78 (Fig. 6) so that the cross member 49 is effective to cam the member upwardly as the marker arm is raised.

Selective disengagement of either of the latch elements 70 is effected through the medium of a hand lever 80 pivotally supported on the implement frame for transverse swing and projecting forwardly therefrom for convenient access by the tractor operator. As shown in Figs. 1–3, the lever 80 terminates at its lower end in a U-shaped base member 81 adapted to fit between spaced cross members 82 and 83 extending between the strut plates 30. A pin 84 extending through the cross members and the base member 81 secures the hand lever in place and provides a pivot about which the lever may be rocked.

At its lower end the member 81 straddles a sleeve 85 and is pivotally connected thereto by a pin 86. The sleeve 85 is slidably parallel to the tool bar 25 in apertures in the strut plates 30. Connecting elements such as rods 87 which together with the chains 55 constitute a pair of axially movable tensile members for each marker arm, are threaded into opposite ends of the sleeve 85. The rods 87 extend to and are operatively connected at their outer ends with the respective latch elements 70 as by having their ends bent over and engaging in suitable openings in the latch elements.

The springs 75 acting on the latch elements 70 tend to maintain the elements in latching engagement with the arms and also to locate the hand lever 80 in a centered position. The rocking of the hand lever 80 in one direction from such centered position is effective to exert a pull on one of the latch elements 70 effective to rock that element to disengaged position, while movement of the hand lever in the opposite direction disengages the other latch element. Preferably sufficient lost motion is provided in the connection between the operating rods and the latch elements so that the release of either element may be effected while the other remains in latched position.

In the operation of an implement equipped with marking mechanism of the type herein described, it will be evident that both of the marking arms 11 will be raised to their retracted positions as an incident to the raising of the implement to transport position. The latch elements 70 associated with the arms effectively retain them in such retracted positions independently of the actuating mechanism in the event that the implement is subsequently lowered to or toward the operating position as shown in Fig. 1. Either arm may then be released for operation at the will of the operator by simply shifting the hand lever 80 toward the arm to be released. It will be appreciated, of course, that the arms may be allowed to remain in retracted position while the implement is working, if they are not required and, moreover, may be kept retracted while the implement is being transported and while it is idle.

The provision of the individual latch elements for the marker arms permits the use of simple, foolproof mechanism for raising the same by power derived through the collapse of the hitch linkage incident to the raising of the implement to transport position. The cost of the mechanism is thus substantially reduced, its maintenance is greatly facilitated and its dependability is materially increased. The mounting of the marker arms 11 on the tool bar 25 by clamp devices coupled onto the detachable connections of the chains 55 and rods 87 with the arms and latch elements permits quick and easy removal of the arms when the implement is to be used in operations where no row gauging or marking is required.

We claim:

1. In combination, a tractor having a power operated hitch linkage including a lower link and an upper link, each of said links having connecting elements on the trailing end portions thereof, and an implement comprising a frame including a transverse member and a generally upright strut plate rigid with and adjacent the center of said transverse member, said frame having coupling means thereon coupled to respective ones of said connecting elements for supporting said implement, a ground-engaging element including an elongated marker arm, means including a pair of fore and aft spaced legs at the inner end portion of said arm pivotally connecting said arm to one end portion of said transverse member for pivotal movement between raised and lowered positions, a cross member between said spaced legs and positioned outwardly of said pivotal connecting means, said cross member having a laterally extending rigid strut projecting therefrom in a generally upward direction, a spring biased latch member fixed to said transverse member adjacent said pivotal connecting means for releasably engaging said cross member when said arm is in raised position, a pair of tensile members extending inwardly from adjacent the inner end portion of said arm toward said upright strut plate, the first one of said tensile members having its outer end portion connected to said latch member, the second one of said tensile members being flexible and having its outer end portion connected to the projecting end portion of said lateral strut, a pair of levers extending adjacent said upright strut plate in a generally fore and aft direction, the first of said levers being pivotally connected intermediate its end portions to said strut plate for transverse swing and having its forward end portion projecting forwardly toward said tractor and having its trailing end portion connected to the inner end portion of the first one of said pair of tensile members for manually releasing said latch member, the second of said levers being pivotally connected intermediate its end portions to said strut plate for vertical swing, said second lever having its trailing end portion connected to the inner end portion of said second tensile member and having a transverse abutment piece on its forward end portion positioned for abutting engagement with said upper link of said hitch linkage so that said upper link will engage and relatively depress said abutment piece upon lifting said implement, and a pulley mounted on said frame adjacent the center thereof for engaging an intermediate portion of said second tensile member to guide the inner end portion thereof toward said second lever so that said second tensile member is moved axially upon relative downward movement of said abutment piece for raising said marker arm.

2. In combination, a tractor having a power operated hitch linkage including a lower link and an upper link, each of said links having connecting elements on the trailing end portions thereof, an implement comprising a frame including a transverse member and a pair of transversely-spaced upright strut plates rigid with said transverse member and adjacent the center thereof, said frame having coupling means on the lower portion thereof and on the upper end portion of said strut plates for supporting said implement, said coupling means being positioned to correspond to the position of said connecting elements of said hitch links, a pair of marker arms having marker elements at the outer end portions thereof, means including a pair of fore and aft spaced legs at the inner end portions of each of said marker arms pivotally connecting each of said arms to opposite end portions of said transverse member for pivotal movement between raised and lowered positions, a cross member between said spaced legs and positioned outwardly from said pivotal connecting means, said cross member having a laterally extending rigid strut projecting therefrom in a generally upwardly direction, a spring biased latch member fixed to said transverse member adjacent each of said pivotal connecting means for releasably engaging said cross member when said arms are in raised position, two pairs of tensile members, each pair of tensile members extending inwardly from the inner end portion of each of said arms toward said upright strut plates, the first one of each pair of tensile members having its outer end portion connected to a respective one of said latch members, the second one of each pair of tensile members being flexible and having its outer end portion connected to the projecting end portion of a respective one of said lateral struts, a pair of levers extending between said upright strut plates in a generally fore and aft direction, the first of said levers being pivotally connected to said strut plates for transverse swing and having its trailing end portion connected to the inner end portions of both of the first ones of said pairs of tensile members for alternately releasing said latch members, the second of said levers being pivotally connected to said strut plates intermediate its ends for vertical swing, said second lever having its trailing end portion connected to the inner end portions of both of said second tensile members and having a crosspiece adjacent its other end positioned forwardly thereof so that the upper link of said hitch linkage will engage and relatively depress said crosspiece upon lifting said implement, and a pair of pulleys mounted on said frame adjacent the center thereof for engaging an intermediate portion of respective ones of said second tensile members to guide the inner end portions thereof upwardly toward said second lever so that said second tensile members are moved axially upon relative downward movement of said abutment piece for raising said marker arms.

3. In combination a tractor having a power operated hitch linkage including a lower link and an upper link, each of said links having connecting elements on the trailing end portions thereof, an implement comprising a frame including a transverse member and an upright strut plate rigid with said transverse member, said frame having coupling means on the lower portion thereof and on the upper end portion of said strut plate for supporting said implement, said coupling means being positioned to correspond to the position of said connecting elements of said hitch links, a pair of marker arms each having a marker element at the outer end portion thereof, means including a pair of fore and aft spaced legs at the inner end portion of each said marker arm pivotally connecting each of said arms to one end portion of said transverse member for pivotal movement between raised and lowered positions, a cross member between said spaced legs and positioned outwardly of said pivotal connecting means, said cross member having a laterally extending rigid strut projecting therefrom in a generally upward direction, a spring biased latch member fixed to said transverse member adjacent said pivotal connecting means for releasably engaging said cross member when said arm is in raised position, a pair of tensile members extending inwardly from the inner end portion of each of said arms toward said upright strut plate, the first one of said pair of tensile members having its outer end portion connected to said latch member, the second one of said pair of tensile members being flexible and having its outer end portion connected to the projecting end portion of said lateral strut, a pair of levers extending in a generally fore and aft direction, the first of said levers being pivotally connected to said strut plate for transverse swing and having its trailing end portion connected to the inner end portions of the first one of said pair of tensile members for releasing said latch members upon transverse swings of said lever, the second of said levers being pivotally connected intermediate its forward and trailing end portions to said strut plate for vertical swing, said second lever having its trailing end portion connected to the inner end portions of said second tensile members and having a crosspiece on its forward end portion positioned so that the upper link of said hitch linkage will engage and relatively depress said crosspiece upon lifting said implement, and pulleys mounted on said frame adjacent said strut plate for engaging intermediate portions of said second tensile members to guide said second tensile members for axial movement upon relative downward movement of said abutment piece for raising said marker arms.

4. In combination a tractor having a power operated hitch linkage including a pair of transversely spaced lower links and an upper link, each of said links having connecting elements on the trailing end portions thereof, an implement comprising a frame including a transverse member and a generally upright strut rigid with said transverse member and adjacent the center thereof, said frame having coupling means on the lower portion thereof and on the upper end portion of said strut for supporting said implement, said coupling means being positioned to correspond to the position of said connecting elements of said hitch links, a pair of ground-engaging elements each including an elongated marker arm, means pivotally connecting each of said arms to opposite end portions of said transverse member for pivotal movement between raised and lowered positions, spring biased means fixed to said transverse member and adjacent the end portions thereof for latching each of said arms in raised position, and for unlatching said arms upon inward pull on said means, two pairs of tensile members, each of said pairs of tensile members extending inwardly from adjacent the inner end portion of a corresponding one of said arms toward said upright strut, the first one of each pair of tensile members having its outer end portion connected to a corresponding one of said latch means, the second one of each pair of tensile members being flexible and having its outer end portion connected to a corresponding one of said arms at a point spaced from said pivot means, a pair of levers extending forwardly and rearwardly of said strut, the first of said levers being pivotally mounted on said strut for transverse swing and having its forward end portion adapted to be moved manually and its trailing end portion connected to the inner end portions of both of the first ones of said pairs of tensile members for selectively releasing said latch means, the second of said levers being pivotally mounted intermediate its ends on said strut for vertical swing, said second lever having its trailing end portion connected to the inner end portions of both of said second tensile members and having a crosspiece on its forward end portion positioned so that the upper link of said hitch linkage wil lengage and move said forward end portion downwardly relative to said frame upon lifting said implement, and a pair of pulleys mounted on said frame adjacent the center therefor for engaging respective ones of said second tensile members to guide the inner end portions thereof upwardly toward said second lever so that said second tensile members are moved axially inwardly upon relative downward movement of said crosspiece for raising said marker arms.

(References on following page)

References Cited in the file of this patent

UNITED STATES PATENTS

| | | |
|---|---|---|
| 1,025,040 | Woods et al. | Apr. 30, 1912 |
| 1,911,218 | White | May 30, 1933 |
| 2,063,852 | Ray | Dec. 8, 1936 |
| 2,175,282 | Cormany | Oct. 10, 1939 |
| 2,178,124 | Robinson | Oct. 31, 1939 |
| 2,371,037 | Englund | Mar. 6, 1945 |
| 2,502,067 | Weaks | Mar. 28, 1950 |
| 2,529,809 | Mellen | Nov. 14, 1950 |
| 2,534,761 | Englund | Dec. 19, 1950 |
| 2,585,992 | Bjerkan | Feb. 19, 1952 |
| 2,604,027 | Hansen | July 22, 1952 |
| 2,656,801 | Hansen et al. | Oct. 27, 1953 |

FOREIGN PATENTS

| | | |
|---|---|---|
| 624,707 | Great Britain | June 15, 1949 |